US008990662B2

(12) United States Patent
Paul et al.

(10) Patent No.: US 8,990,662 B2
(45) Date of Patent: Mar. 24, 2015

(54) TECHNIQUES FOR RESILIENT COMMUNICATION

(71) Applicant: Intel Corporation, Santa Clara, CA (US)

(72) Inventors: Somnath Paul, Hillsboro, OR (US);
Sriram R. Vangal, Portland, OR (US);
Michael D. Abbott, Hillsboro, OR (US);
Eugene M. Kishinevsky, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/631,937

(22) Filed: Sep. 29, 2012

(65) Prior Publication Data

US 2014/0095953 A1   Apr. 3, 2014

(51) Int. Cl.
*H03M 13/00* (2006.01)
*G06F 11/14* (2006.01)

(52) U.S. Cl.
CPC .................................. *G06F 11/1443* (2013.01)
USPC .......................................... 714/775; 714/798

(58) Field of Classification Search
CPC ............................... H04L 7/048; H04L 1/0057
USPC ................................................... 714/775, 798
See application file for complete search history.

(56) References Cited

U.S. PATENT DOCUMENTS

| 5,321,813 | A | * | 6/1994 | McMillen et al. | ............. 714/798 |
| 5,832,251 | A | * | 11/1998 | Takahashi | ........................ 703/23 |
| 5,903,719 | A | * | 5/1999 | Yamamoto | ................. 714/38.12 |
| 5,959,995 | A | | 9/1999 | Wicki et al. | |
| 6,243,361 | B1 | * | 6/2001 | McMillen et al. | ............. 370/254 |
| 2003/0110422 | A1 | | 6/2003 | Naffziger et al. | |
| 2010/0046364 | A1 | | 2/2010 | Sugizaki | |
| 2011/0219280 | A1 | | 9/2011 | Blumrich et al. | |
| 2012/0099475 | A1 | | 4/2012 | Tokuoka | |

FOREIGN PATENT DOCUMENTS

WO    WO 2014/051746    4/2014

OTHER PUBLICATIONS

International Search Report & Written Opinion for International Application No. PCT/US2013/045790, Mailed Nov. 14, 2013, 9 pages.

* cited by examiner

*Primary Examiner* — Fritz Alphonse
(74) *Attorney, Agent, or Firm* — Patent Capital Group (57) ABSTRACT

Techniques for resilient communication. A data path stores data to be transmitted over a link to a receiving node. An output stage is coupled between the data path and the link. The output stage includes double sampling mechanisms to preserve a copy of data transmitted over the link to the receiving node. Error detection circuitry is coupled with the output stage to detect transient timing errors in the data path or output stage. The error detection circuitry causes the output stage to send the copy of the data transmitted over the link in response to detecting an error.

24 Claims, 6 Drawing Sheets

TECHNIQUES FOR RESILIENT COMMUNICATION

TECHNICAL FIELD

Embodiments of the invention relate to techniques for communication between interconnected nodes. More particularly, embodiments of the invention relate to resilient communication techniques that may be utilized to provide reliable, efficient communication of messages.

BACKGROUND

Many interconnection architectures, for example, in a network-on-chip (NoC) of a system-on-chip (SoC), rely on routers to manage messaging traffic between nodes (e.g., processor cores, memory). These routers consume power to operate and may contribute significantly to the overall power consumption for a SoC. One strategy for reducing power consumption is to reduce operating voltages. However, at low voltages the routers are prone to dynamic variations such as voltage droops or aging effects, which can potentially lead to timing failures in the router. Robustness of operation is typically ensured by use of a static voltage guard band selected at design time. Use of a static voltage guard band requires a higher operating voltage and increases power consumption.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Various embodiments of routers that may be utilized in different configurations, some of which may provide error detection and correction. In one embodiment, input-buffered, wormhole-switched router architectures (for example, suitable for a network-on-chip, NoC) can be configured to operate as: 1) a router with single-cycle latency, 2) a router with two-cycle latency and without resiliency, or 3) a router with two-cycle latency and resiliency to dynamic variations. These modes of operation are described in greater detail below.

In one embodiment, in the two-cycle latency with resiliency mode, dynamic variations that manifest at timing failures in the router are detected using Error Detection Sequential (EDS) mechanisms that can be hardware circuitry. In one embodiment, the resilient router architecture includes EDS in a processing stage that can operate to protect timing paths within the router. Correction of messages exposed to timing failures inside the router can be accomplished utilizing packet replay techniques.

In one embodiment, the EDS scheme provides native protection against soft-error (SER) induced events due to double-sampling. In addition, the disclosed scheme can protect against SER related combinational delay pushouts and sequential state loss.

In one embodiment, a router (or other component) includes a resiliency-enhanced final stage that operates to protect timing paths within the router. For example, a router having EDS mechanisms operates to protect all timing paths in the router that originate from an output (e.g., FIFO) queue. In one embodiment, correction of packet (or message, or flit) errors based on timing failures within the router (or other component) is accomplished via packet replay techniques.

Because the timing failure at the output stage is determined after a message has been transmitted to the receiving node (e.g., router, traffic generator), an error signal (e.g., bit, flag) is transmitted with the message to indicate whether a timing failure has occurred. Because the error signal may be metastable, it is latched in the input stage of the receiving node before consumption. The error signal operates as an invalidation signal to cause the corresponding message to be squashed (or otherwise not consumed or used) by the receiving node.

The transmitting node (e.g., router) that suffered from the timing failure replays the failed message by rolling back its state by the necessary number of clock cycles (e.g., to a checkpoint). In one embodiment, two clock cycles is sufficient. In alternate embodiments, a greater rollback range may be supported. In one embodiment, this can be accomplished by isolating the control and data path for the transmitting node and keeping copies for critical data and control state elements (e.g., via flip flop or latch) in the transmitting node.

In one embodiment, an output queue (e.g., a FIFO or other type of output queue) has enough unused space during normal operation that messages from previous cycles are still present and not overwritten before they are used for retransmission when necessary. In another embodiment, FIFO depth can be increased to accommodate additional message space for retransmission. For example, in one embodiment, a timing error is determined and the message is retransmitted within two clock cycles. The transmitting node is rolled back to a previous state and the failing message is retransmitted to the receiving node.

In one embodiment, use of positive phase latches in the EDS mechanism may cause the output stage prone to hold time failures. This can be avoided by selectively buffering minimum-delay timing paths to EDS-enhanced stages and feeding a pulsed clock to the output stage, which is described in greater detail below. In one embodiment, the output stage receives a configurable pulse width clock signal and other stages receive a 50% duty cycle clock signal. In one embodiment, to reduce the effect of within-die and intra-die variations at very low operating voltages (e.g., near threshold voltage), a pruned standard cell library with upsized sequential and combinational logic states may be used. In addition to replaying current source/destination ports, can be used as an indicator for other ports and by error-logging logic to trigger DVFS schemes.

Figure 1:
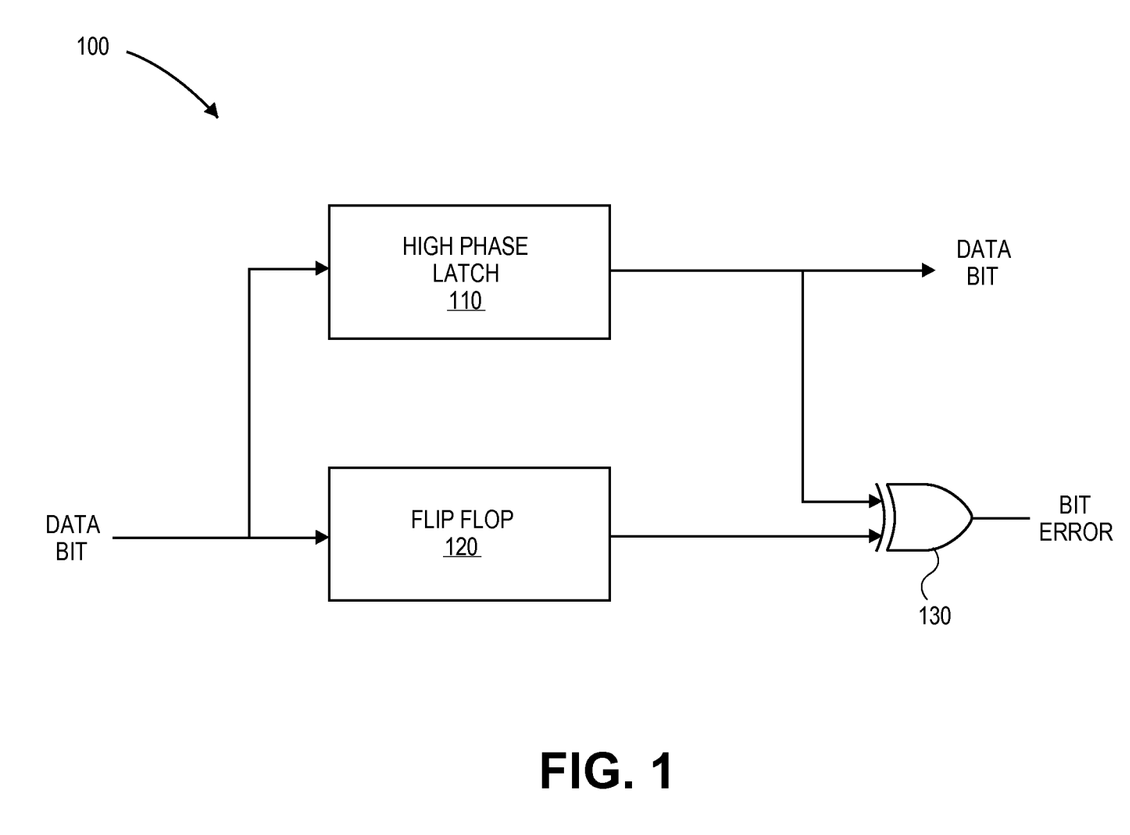
FIG. 1 is a block diagram of one embodiment of an error detection circuit that may be used to support resilient communication techniques.

FIG. 1 is a block diagram of one embodiment of an error detection circuit that may be used to support resilient communication techniques. The circuit of FIG. 1 may be used to generate an error signal that may be used to retransmit messages (packets, flits) that have suffered from a timing failure.

In one embodiment, error detection circuit 100 is located within a final stage of transmitting node on the path to a link to a receiving node.

Error detection circuit 100 receives a data bit from a stage within the transmitting node. The data bit is provided to high phase latch 110 and to flip flop 120. High phase latch 110 latches the data bit when a clock signal (See FIG. 3) provided to the output stage is high and flip flop 120 latches the data bit on the low to high transition of a pulsed clock signal (See FIG. 3).

If a timing error occurs, the output signals from high phase latch 110 and flip flop 120 will be different, which will cause gate 130 to assert the bit error signal. If a timing error does not occur, the output signals from high phase latch 110 and flip flop 120 will be the same and gate 130 will not assert the bit error signal.

Figure 2:
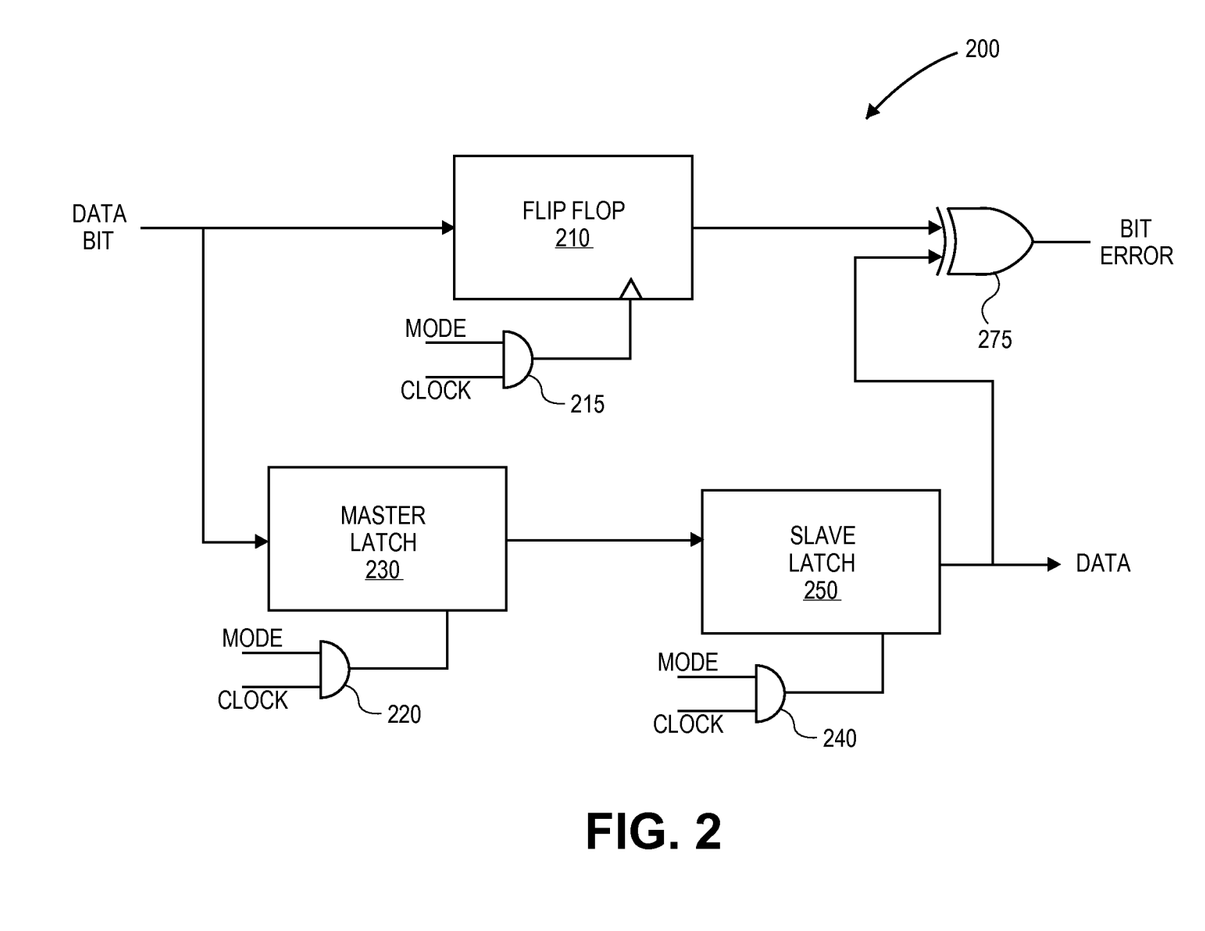
FIG. 2 is a block diagram of one embodiment of a double-sampling error detection circuit that may be used to support resilient communication techniques without incurring high design overheads.

FIG. 2 is a block diagram of one embodiment of a double-sampling error detection circuit that may be used to support resilient communication techniques. The circuit of FIG. 2 may be used to generate an error signal that may be used to retransmit messages (packets, flits) that have suffered from a timing failure. In one embodiment, error detection circuit 200 is located within a final stage of transmitting node on the path to a link to a receiving node and provides double-sampling, which allows packets and other information (e.g., state information) to be maintained for two clock cycles to recover from a timing failure. In alternate embodiments, more than two samples can be maintained, for example, triple-sampling error detection may be provided.

In one embodiment, error detection circuit may operate in one of three modes: 1) Mode 0 where both master latch 230 and slave latch 250 are open; 2) Mode 1 where master latch 230 and slave latch 250 operate as a flip flop; and 3) Mode 2 where master latch 230 is open and double sampling is provided by slave latch 250 and flip flop 210. Each of flip flop 210, master latch 230 and slave latch 250 is controlled by a mode signal and a clock signal as operated on by logic gates 215, 220 and 240, respectively.

In Mode 0, error detection circuit 200 is effectively transparent to the surrounding circuits. In Mode 1, error detection circuit 200 operates as a flip flop for the data bit. In Mode 2, error detection circuit 200 operates as a positive phase latch with double sampling in the latch and a flip flop for timing error detection.

The data bit to be transmitted is the input signal to flip flop 210 and master latch 230. The output signal from flip flop 210 provides one input to logic gate 275 that generates the bit error signal. The output signal from master latch 230 is the input signal to slave latch 250. The output signal from slave latch 250 provides a second input to logic gate 275 and is also the data bit to be transmitted.

If a timing error occurs, the output signals from flip flop 210 and slave latch 250 will be different, which will cause gate 275 to assert the bit error signal. If a timing error does not occur, the output signals from flip flop 210 and slave latch 250 will be the same and gate 275 will not assert the bit error signal.

In one embodiment, an error detection circuit is provided for each data bit to be transmitted. The bit error signals corresponding to the multiple data bits can be combined to determine whether an error exists for any of the data bits in the message to be transmitted. In one embodiment, if there is an error for any one of the data bits, the message is replayed as described herein.

Figure 3:
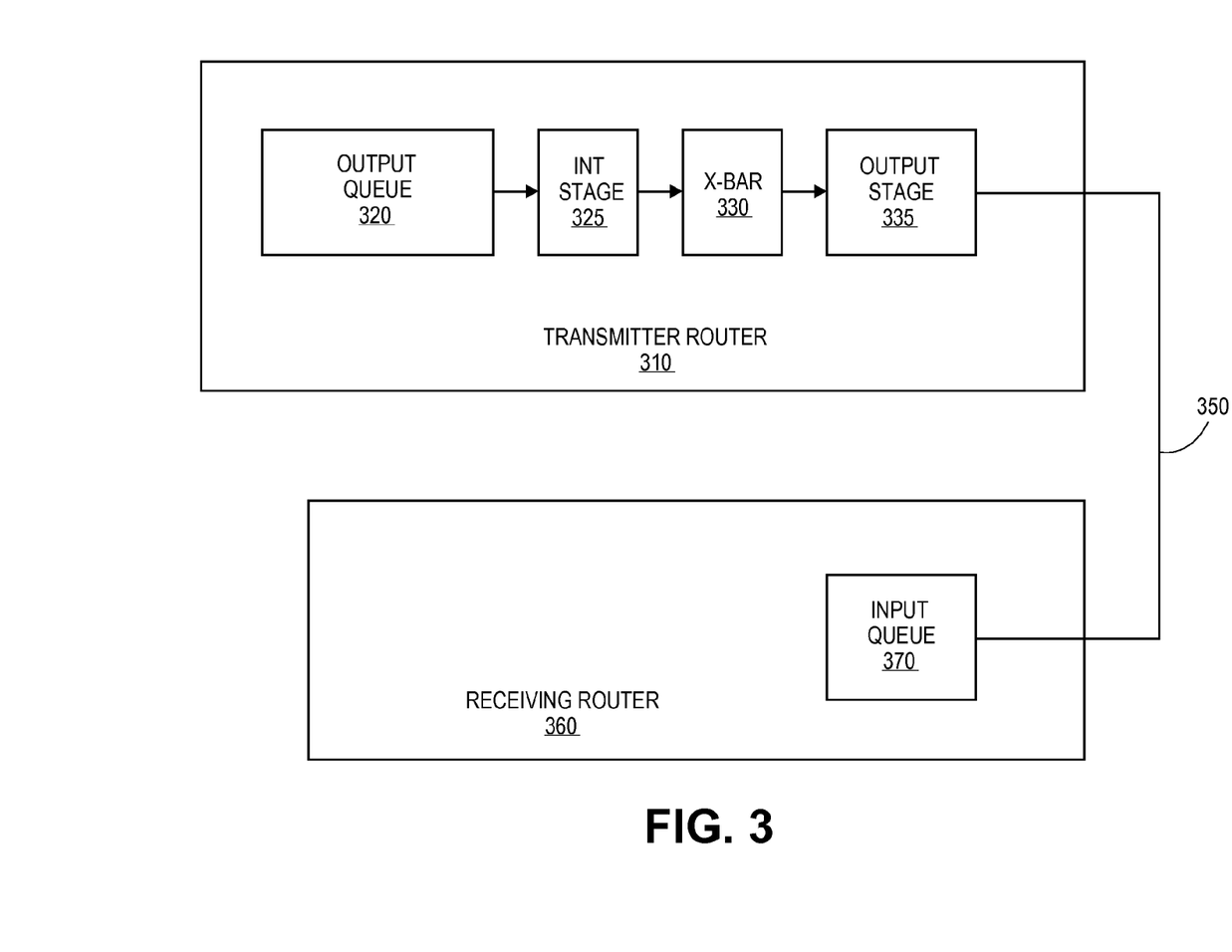
FIG. 3 is a block diagram of a router having resiliency to dynamic variations configured to transmit data to a router/traffic generator (TG).

FIG. 3 is a block diagram of a router having resiliency to dynamic variations configured to transmit data to a router/traffic generator (TG). The example of FIG. 3 may be two routers within a network on chip (NoC) architecture; however, the resiliency concepts are applicable to other configurations as well.

Transmitting router 310 stores data that is to be transmitted to receiving router 360 over link 350, which can be any type of link. Transmitting router 310 receives the data from some data source (not illustrated in FIG. 3) and temporarily stores the data in output queue 320. Output queue 320 may be, for example, a first in/first out (FIFO) queue, or any other type of structure for staging data to be transmitted.

Data from output queue 320 is transferred to crossbar (x-bar) 330 via intermediate stage 325. In one embodiment, output queue 320 operates on a negative phase latch and intermediate stage 325 operates on a positive phase latch; however, other latching configurations may also be supported. In one embodiment, output queue 320 and intermediate stage 325 operate using a clock signal that has a 50% duty cycle; however, other duty cycles can also be utilized.

Crossbar 330 operates to route data from input ports to output ports to provide the routing functionality of transmitting router 310. Crossbar 330 may be any type of crossbar mechanism. Crossbar 330 routes data to be transmitted over link 350 to output stage 335. In one embodiment, output stage 335 operates on a pulsed clock signal that has a duty cycle that is less than 50%, or less than the duty cycle of the clock signal used by output queue 320 and intermediate stage 325.

Output stage 335 includes error detection circuitry, for example the error detection circuitry illustrated in FIG. 1 or in FIG. 2. Output stage 335 operates to transmit the data from output queue 320 along with the bit error signal to receiving router 360 over link 350. Input queue 370 in receiving router 360 receives the data and the bit error signal. In one embodiment, input queue 370 stores the data and the bit error signal, which can be used as described below.

Figure 4:
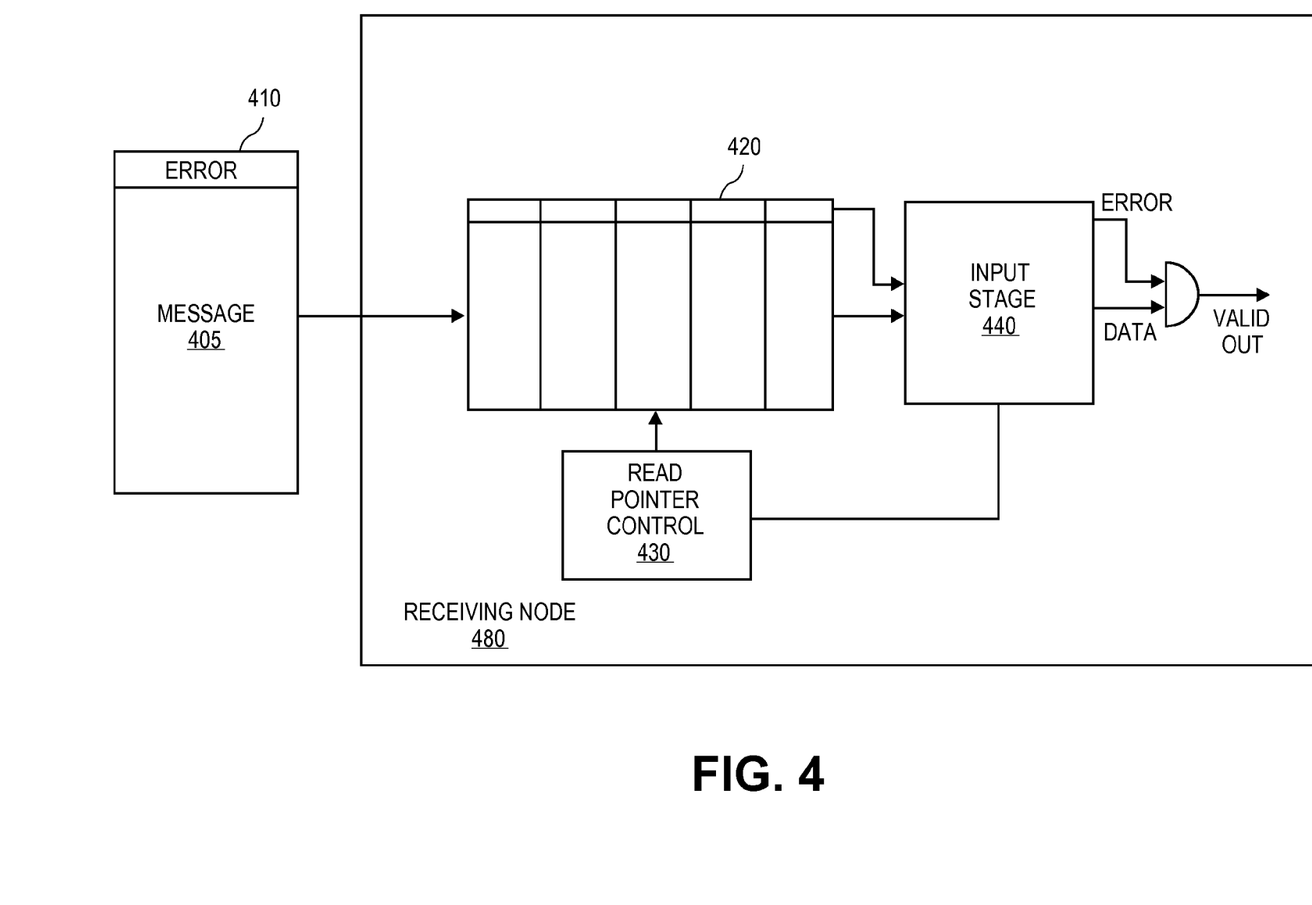
FIG. 4 is a block diagram of a receiving router (or other device) that uses the bit error signal to validate received data.

FIG. 4 is a block diagram of a receiving router (or other device) that uses the bit error signal to validate received data. Receiving node 480 can be, for example, a router or a memory or a processing core, or any other type of logic core, for example, intellectual property core or other processing circuitry. Message 405 is transmitted to receiving node 480 along with one or more error signals 410, which can be, for example, one or more bits as described above.

Receiving node 480 receives message 405 and corresponding error signal(s) 410 and stores them in input buffer 420. Input buffer 420 stores multiple messages along with corresponding error signals. In one embodiment, input buffer operates as a first in/first out (FIFO) queue; however, other structures may also be supported. Read pointer control 430 operates to control the position of a read pointer for input buffer 420 that is utilized to read messages from input buffer 420 at the correct time.

In one embodiment, input stage 440 reads a message and corresponding error signal from input buffer 420 as indicated by the read pointer. Input stage 440 uses the error signal from the source node to validate the output signal in receiving node 480. The output data may be validated in the same manner as the data in the source node. In one embodiment, the read pointer is only advanced when an error-free message is read from input buffer 420. This allows the message to be retransmitted until an error-free transmission occurs without the need for rolling back the state of receiving node 480.

Figure 5:
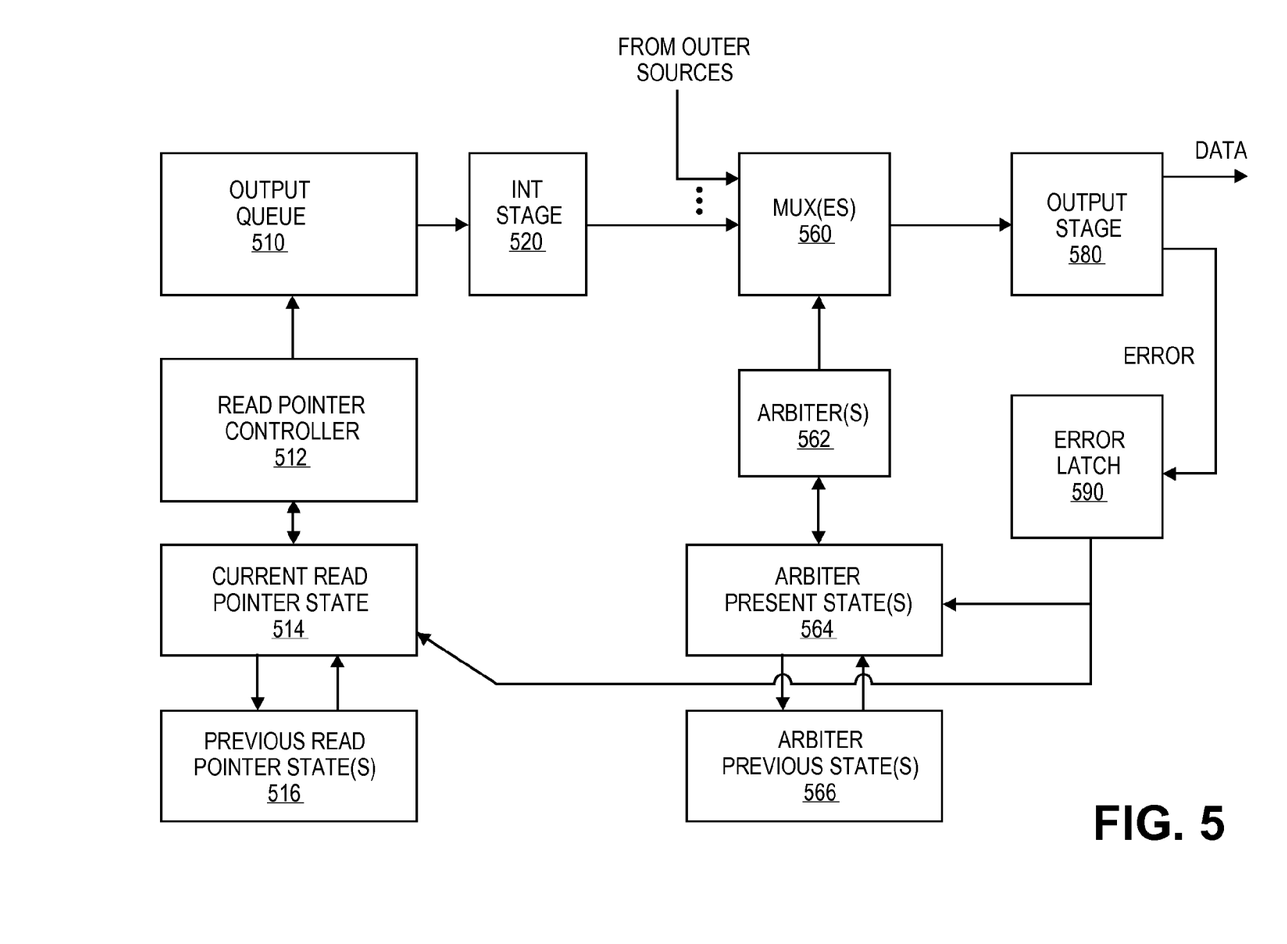
FIG. 5 is a block diagram of one embodiment of a source node with rollback mechanisms to support timing resiliency.

FIG. 5 is a block diagram of one embodiment of a source node with rollback mechanisms to support timing resiliency. The error signal can be used to control a rollback within the source node to retransmit the message in error to the receiving node. As discussed above, the output stage generates an error signal that is associated with the transmitted data and one or more stages of the transmitting node can store transmitted data, for example, in a FIFO queue.

Output queue 510 receives the data from some data source (not illustrated in FIG. 5) and temporarily stores the data. Output queue 510 may be, for example, a first in/first out (FIFO) queue, or any other type of structure for staging data to be transmitted. Data from output queue 510 is transferred to intermediate stage 520. In one embodiment, output queue 510 operates on a negative phase latch and intermediate stage 520 operates on a positive phase latch; however, other latching configurations may also be supported. In one embodiment, output queue 510 and intermediate stage 520 operate using a clock signal that has a 50% duty cycle; however, other duty cycles can also be utilized.

Read pointer controller 512 manages a read pointer used to read data from output queue 510. Read pointer controller 512 changes the position of the read pointer as data is read from output queue 510. Read pointer controller 512 has associated with it state information (current read pointer state 514) that is used in managing the read pointer. In one embodiment, state information from previous pointer positions (previous read pointer state(s) 516) is also stored for rollback purposes. In the example embodiment where two messages are maintained for resiliency purposes, the previous two sets of state information can be maintained. In alternate embodiments, more or less state information can be maintained.

Multiple multiplexors 560 can be used to route data from intermediate stage 520 and/or data from other sources to output stage 580. Associated with multiplexors 560 are arbiters 562 that control the operation of multiplexors 560 to provide the desired switching functionality. Arbiters 562 have associated with them state information (arbiter present states 564) that is used in managing the operation of arbiters 562. In one embodiment, state information from previous arbiter states (previous arbiter state(s) 566) is also stored for rollback purposes. In the example embodiment where two messages are maintained for resiliency purposes, the previous two sets of state information can be maintained. In alternate embodiments, more or less state information can be maintained.

Output stage 580 operates to generate an error signal as described above. The error signal can be latched by error latch 590, for example, a flip flop, or other device. The error signal can then be provided to cause previous state information to be utilized by read pointer controller 512 and arbiters 562 to rollback to a previous state and to retransmit a message that had been transmitted with an error. This technique can operate to resend data without moving on to transmit subsequent data until the transmission occurs with no errors, which eliminates ordering issues that may otherwise occur. Further, recovery can occur in 1-3 cycles, which provides an efficient and nearly transparent error recovery mechanism.

Figure 6:
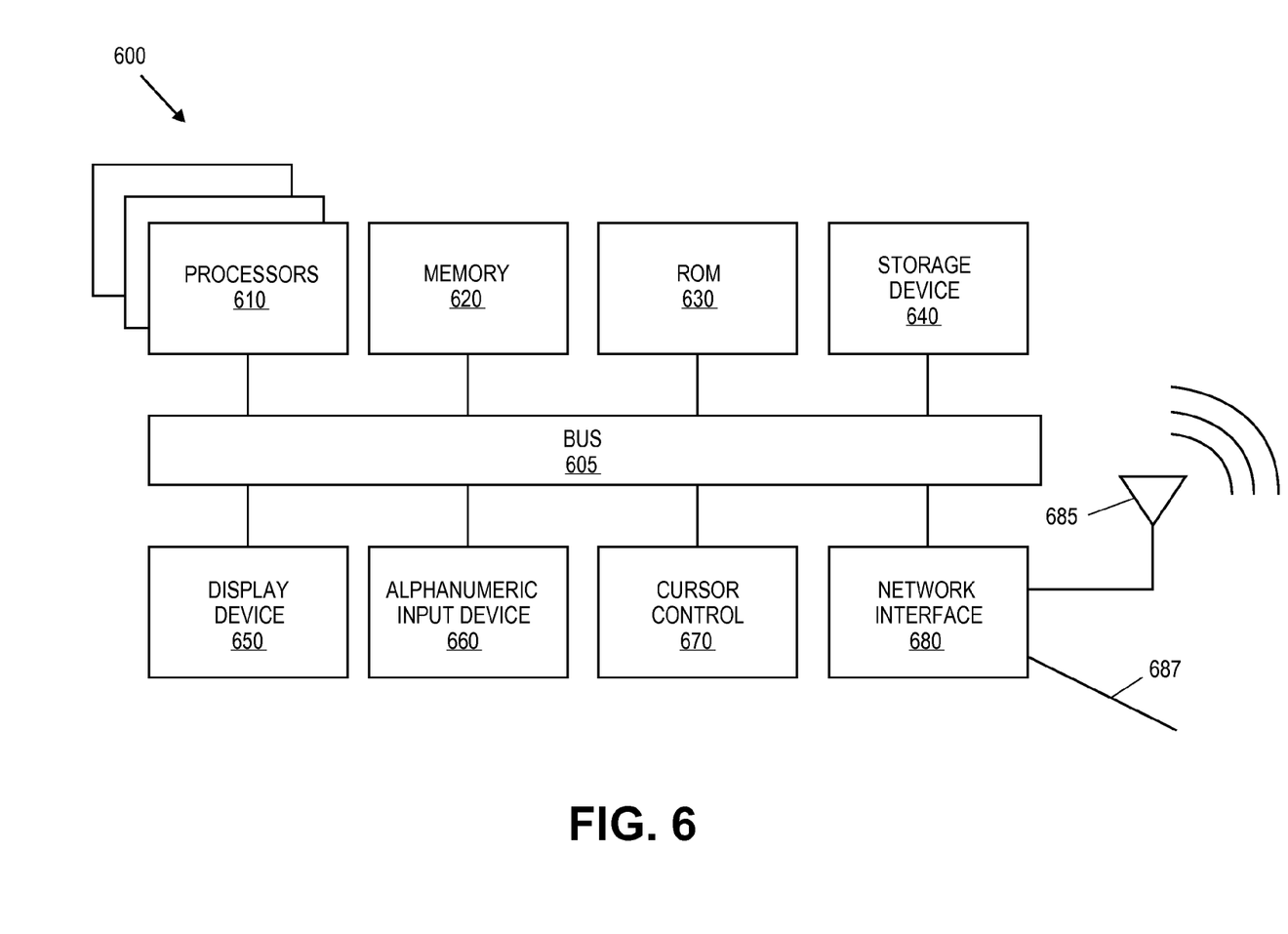
FIG. 6 is a block diagram of one embodiment of an electronic system.

FIG. 6 is a block diagram of one embodiment of an electronic system. The electronic system illustrated in FIG. 6 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 600 includes bus 605 or other communication device to communicate information, and processor 610 coupled to bus 605 that may process information. While electronic system 600 is illustrated with a single processor, electronic system 600 may include multiple processors and/or co-processors. Electronic system 600 further may include random access memory (RAM) or other dynamic storage device 620 (referred to as main memory), coupled to bus 605 and may store information and instructions that may be executed by processor 610. Main memory 620 may also be used to store temporary variables or other intermediate information during execution of instructions by processor 610.

Electronic system 600 may also include read only memory (ROM) and/or other static storage device 630 coupled to bus 605 that may store static information and instructions for processor 610. Data storage device 640 may be coupled to bus 605 to store information and instructions. Data storage device 640 such as a magnetic disk or optical disc and corresponding drive may be coupled to electronic system 600.

Electronic system 600 may also be coupled via bus 605 to display device 650, such as a cathode ray tube (CRT) or liquid crystal display (LCD), to display information to a user. Alphanumeric input device 660, including alphanumeric and other keys, may be coupled to bus 605 to communicate information and command selections to processor 610. Another type of user input device is cursor control 670, such as a mouse, a trackball, or cursor direction keys to communicate direction information and command selections to processor 610 and to control cursor movement on display 650.

Electronic system 600 further may include network interface(s) 680 to provide access to a network, such as a local area network. Network interface(s) 680 may include, for example, a wireless network interface having antenna 685, which may represent one or more antenna(e). Network interface(s) 680 may also include, for example, a wired network interface to communicate with remote devices via network cable 687, which may be, for example, an Ethernet cable, a coaxial cable, a fiber optic cable, a serial cable, or a parallel cable.

In one embodiment, network interface(s) 680 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 680 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

The invention claimed is:
1. An apparatus comprising:
a data path to store data to be transmitted over a link to a receiving node;

an output stage coupled between the data path and the link, the output stage having double sampling mechanisms to preserve a copy of data transmitted over the link to the receiving node;

error detection circuitry coupled with the output stage to detect transient timing errors in the data path or output stage, the error detection circuitry to cause the output stage to re-send the copy of the data transmitted over the link in response to detecting an error.

2. The apparatus of claim 1 wherein the data path, output stage and error detection circuitry are part of a router within a network on chip (NoC) architecture.

3. The apparatus of claim 1 wherein the data path comprises at least a first in/first out (FIFO) queue coupled with a crossbar circuit, the crossbar circuit coupled with the output stage.

4. The apparatus of claim 1 wherein the data path comprises at least a crossbar circuit coupled with a first in/first out (FIFO) queue, the FIFO queue coupled with the output stage.

5. The apparatus of claim 3 wherein the error detection circuitry detects transient timing errors in the FIFO queue and the crossbar circuit.

6. The apparatus of claim 3 wherein a read pointer in the FIFO queue is rolled back in response to the error detection circuitry detecting the transient timing error.

7. The apparatus of claim 3 wherein states for one or more arbiters within the data path are rolled back in response to the error detection circuitry detecting the transient timing error.

8. The apparatus of claim 1 wherein the output stage transmits an error indication with the data transmitted over the link to invalidate forward-bound erroneous messages.

9. The apparatus of claim 8 wherein the receiving node does not process the data transmitted over the link in response to receiving the error indication.

10. The apparatus of claim 1 wherein the receiving node comprises a router.

11. A method comprising:
generating an error signal corresponding to a data signal, the error signal to be transmitted with the data signal, wherein the error signal is generated by error detection circuitry coupled with an output stage to detect transient timing errors
causing the output stage to send a copy of the data transmitted over the link in response to detecting an error;
double sampling to preserve a copy of data transmitted over the link.

12. The method of claim 11 wherein the data path, output stage and error detection circuitry are part of a router within a network on chip (NoC) architecture.

13. The method of claim 11 wherein the data path comprises at least a first in/first out (FIFO) queue coupled with a crossbar circuit, the crossbar circuit coupled with the output stage.

14. The method of claim 11 wherein the data path comprises at least a crossbar circuit coupled with a first in/first out (FIFO) queue, the FIFO queue coupled with the output stage.

15. The method of claim 13 wherein the error detection circuitry detects transient timing errors in the FIFO queue and the crossbar circuit.

16. The method of claim 13 wherein a read pointer in the FIFO queue is rolled back in response to the error detection circuitry detecting the transient timing error.

17. The method of claim 13 wherein states for one or more arbiters within the data path are rolled back in response to the error detection circuitry detecting the transient timing error.

18. The method of claim 11 wherein the output stage transmits an error indication with the data transmitted over the link to invalidate forward-bound erroneous messages.

19. The method of claim 18 wherein the receiving node does not process the data transmitted over the link in response to receiving the error indication.

20. The method of claim 11 wherein the receiving node comprises a router.

21. An apparatus comprising:
a plurality of intellectual property (IP) cores; and
an interconnect network fabric to be coupled to the plurality of IP cores, the interconnect network fabric to include routing logic to route flits between at least the IP cores, wherein the routing logic comprises replay logic to:
checkpoint one or more flits and one or more control state elements for a number of previous cycles prior to a current cycle,
roll-back a state associated with the routing logic based on the checkpoint of one or more flits and one or more control state elements for a number of previous cycles prior to a current cycle in response to an error associated with a flit of the one or more flits; and
re-transmit the flit in response to the rollback of the state.

22. The apparatus of claim 21, wherein the plurality of IP cores and the interconnect network fabric is included in a system on a chip (SOC) integrated circuit, and wherein the SOC is coupled to a controller to receive input from a touch enabled display device.

23. The apparatus of claim 21 wherein the number of previous cycles comprises two.

24. The apparatus of claim 21 wherein the number of previous cycles comprises three.

* * * * *

UNITED STATES PATENT AND TRADEMARK OFFICE
CERTIFICATE OF CORRECTION

PATENT NO.         : 8,990,662 B2                                           Page 1 of 1
APPLICATION NO.    : 13/631937
DATED              : March 24, 2015
INVENTOR(S)        : Somnath Paul et al.

It is certified that error appears in the above-identified patent and that said Letters Patent is hereby corrected as shown below:

Claims

In column 6, line 66, in claim 1, delete "path" and insert --source--,

In column 6, line 66, in claim 1, delete "store" and insert --provide--,

In column 7, line 1, in claim 1, delete "path" and insert --source--,

In column 7, line 6, in claim 1, after "in" insert --at least one of--,

In column 7, line 6, in claim 1, delete "path" and insert --source--,

In column 7, line 10, in claim 2, delete "path or" and insert --source and--,

In column 7, line 13, in claim 3, delete "path" and insert --source--,

In column 7, line 17, in claim 4, delete "path" and insert --source--,

In column 7, line 27, in claim 7, delete "path" and insert --source--,

In column 7, line 38, in claim 11, delete "generating" and insert --generating, using an output stage of a transmitting node,--, In column 7, line 38, in claim 11, delete "signal" and insert --signal of a data source,--, In column 7, line 41, in claim 11, delete "an" and insert --the--, In column 7, line 42, in claim 11, delete "errors" and insert --errors;--, In column 7, line 43, in claim 11, delete "stage" and insert --of the transmitting node--, In column 7, line 46, in claim 11, delete "link" and insert --link within the transmitting node.--, In column 7, line 47, in claim 12, delete "path" and insert --source--, In column 8, line 1, in claim 13, delete "path" and insert --source--, In column 8, line 5, in claim 14, delete "path" and insert --source--, In column 8, line 15, in claim 17, delete "path" and insert --source--, In column 8, line 31, in claim 21, delete "checkpoint" and insert --generate one or more checkpoints corresponding to--.

Signed and Sealed this
Twelfth Day of July, 2016

Michelle K. Lee
*Director of the United States Patent and Trademark Office*